US008528918B2

(12) United States Patent
Macias (10) Patent No.: US 8,528,918 B2
(45) Date of Patent: Sep. 10, 2013

(54) PORTABLE CART FOR HOLDING MULTIPLE TRAYS OF GLASSES

(76) Inventor: Edgar Macias, Woodstock, GA (US)

( * ) Notice: Subject to any disclaimer, the term of this patent is extended or adjusted under 35 U.S.C. 154(b) by 10 days.

(21) Appl. No.: 13/175,078

(22) Filed: Jul. 1, 2011

(65) Prior Publication Data

US 2013/0001904 A1    Jan. 3, 2013

(51) Int. Cl.
*B62B 11/00* (2006.01)
(52) U.S. Cl.
USPC ........................................ 280/47.35; 280/638
(58) Field of Classification Search
USPC ................ 280/47.26, 638, 639, 35, 651, 654, 280/43.1, 43.12, 43.15, 47.11, 47.16, 47.17, 280/47.19, 47.2, 47.34, 47.35, 64, 79.3, 79.5, 280/79.7, 47.29, 47.24; 312/249.8, 201, 312/246; 248/98
See application file for complete search history.

(56) References Cited

U.S. PATENT DOCUMENTS

| | | | | |
|---|---|---|---|---|
| 1,374,986 A * | 4/1921 | Carter | ............................ | 414/426 |
| 2,133,834 A * | 10/1938 | Sheldon | ..................... | 280/47.35 |
| 2,141,881 A * | 12/1938 | Schray | ............................ | 280/651 |
| 2,212,053 A * | 8/1940 | Smith | ............................ | 280/651 |
| 2,220,150 A * | 11/1940 | Goldman | ....................... | 280/641 |
| 2,398,863 A * | 4/1946 | Sides | ............................. | 280/641 |
| 2,433,886 A * | 1/1948 | Bremer | ......................... | 280/648 |
| 2,555,178 A * | 5/1951 | Young | ......................... | 312/249.8 |
| 2,574,743 A * | 11/1951 | King | ................................ | 280/35 |
| 2,582,435 A * | 1/1952 | Howard | ......................... | 280/648 |
| 2,588,830 A * | 3/1952 | Haanstad | ......................... | 84/421 |
| 2,901,262 A * | 8/1959 | Berlin | ............................ | 280/641 |
| 3,052,484 A * | 9/1962 | Huffman et al. | ............... | 280/654 |
| 3,168,329 A * | 2/1965 | Goldschmidt | ................ | 280/651 |
| 3,797,842 A * | 3/1974 | Swick et al. | ................... | 280/651 |
| 3,797,847 A * | 3/1974 | Lindsey et al. | ............... | 280/654 |
| 3,804,432 A * | 4/1974 | Lehrman | ........................ | 280/654 |
| 3,840,242 A * | 10/1974 | Craig et al. | .............. | 280/33.996 |
| 3,858,899 A * | 1/1975 | Bontrager et al. | ............ | 280/641 |
| 3,971,568 A * | 7/1976 | Wright | ..................... | 280/33.996 |
| 4,179,132 A * | 12/1979 | Rich | ............................ | 280/47.26 |
| 4,236,462 A * | 12/1980 | Berthier et al. | ............... | 108/177 |
| 4,346,906 A * | 8/1982 | Thorpe | ..................... | 280/33.996 |
| 4,355,818 A * | 10/1982 | Watts | ............................ | 280/654 |
| 4,542,806 A * | 9/1985 | Olson | ............................ | 182/152 |
| 4,895,381 A * | 1/1990 | Farlow | ..................... | 280/33.997 |
| 5,203,815 A * | 4/1993 | Miller | ............................ | 43/21.2 |
| 5,268,637 A * | 12/1993 | Liken et al. | ............... | 324/756.02 |
| 5,427,394 A * | 6/1995 | Lauto | .......................... | 280/47.35 |
| 5,507,507 A * | 4/1996 | Davidson | ................ | 280/33.991 |
| 5,584,399 A * | 12/1996 | King | ........................... | 211/41.15 |
| 5,599,031 A * | 2/1997 | Hodges | ....................... | 280/79.11 |
| 5,626,352 A * | 5/1997 | Grace | ........................... | 280/47.29 |
| 5,660,637 A * | 8/1997 | Dodge | ............................ | 118/500 |
| 5,779,252 A * | 7/1998 | Bolton, Jr. | ................ | 280/47.371 |
| D399,625 S * | 10/1998 | Murphy et al. | ................ | D34/21 |
| 5,845,915 A * | 12/1998 | Wilson | ....................... | 280/47.19 |

(Continued)

*Primary Examiner* — Katy M Ebner
*Assistant Examiner* — Brodie Follman
(74) *Attorney, Agent, or Firm* — Womble Carlyle Sandridge & Rice, LLP (57) ABSTRACT

A mobile cart comprising a frame, a base and a plurality of shelves is disclosed. The frame may comprise a plurality of vertical and horizontal frame members and the base may comprise a plurality of lateral and horizontal frame members. The cart may also comprise storage container that is supported by a frame portion and the frame portion may be retractable with the base. The cart is ideal for transporting large quantities of glassware or tableware in a commercial environment.

9 Claims, 8 Drawing Sheets

(56) References Cited

U.S. PATENT DOCUMENTS

| | | | |
|---|---|---|---|
| 5,863,055 A * | 1/1999 | Kasravi et al. | 280/47.29 |
| 5,865,449 A * | 2/1999 | Castaneda | 280/33.996 |
| 5,918,861 A * | 7/1999 | Parker | 254/326 |
| 5,931,483 A * | 8/1999 | Haynes | 280/47.19 |
| 6,364,331 B1 * | 4/2002 | Yap | 280/47.371 |
| 6,406,248 B1 * | 6/2002 | McGill et al. | 414/634 |
| 6,497,423 B1 * | 12/2002 | Perelli et al. | 280/47.34 |
| 6,520,514 B2 * | 2/2003 | Clegg | 280/47.26 |
| 6,641,146 B2 * | 11/2003 | Reese | 280/32.6 |
| 6,659,476 B2 * | 12/2003 | Weida | 280/47.19 |
| 6,669,213 B2 * | 12/2003 | Woerner | 280/47.35 |
| 6,688,634 B2 * | 2/2004 | Noffsinger | 280/651 |
| 6,880,851 B1 * | 4/2005 | Summers et al. | 280/652 |
| 6,929,269 B2 * | 8/2005 | Oliver | 280/47.18 |
| 6,953,199 B2 * | 10/2005 | Malloy, III | 280/47.26 |
| 6,957,718 B1 * | 10/2005 | Whiteside et al. | 182/115 |
| 6,988,737 B1 * | 1/2006 | Clark | 280/47.26 |
| 7,168,715 B1 * | 1/2007 | Friedman | 280/47.35 |
| 7,188,847 B1 * | 3/2007 | Friedman | 280/47.35 |
| D544,962 S * | 6/2007 | Diener et al. | D24/186 |
| D546,018 S * | 7/2007 | Goodell | D34/21 |
| D548,918 S * | 8/2007 | Nussberger | D34/17 |
| D555,869 S * | 11/2007 | Zorzo | D34/14 |
| 7,314,143 B1 * | 1/2008 | Johnson | 211/106 |
| 7,320,472 B2 * | 1/2008 | Gregory et al. | 280/79.3 |
| D576,372 S * | 9/2008 | Walter | D34/17 |
| 7,648,147 B2 * | 1/2010 | Lauer et al. | 280/47.35 |
| 7,815,202 B2 * | 10/2010 | Richards et al. | 280/79.7 |
| 7,823,893 B2 * | 11/2010 | Meyers et al. | 280/47.29 |
| 7,946,609 B2 * | 5/2011 | Johnson et al. | 280/652 |
| 7,988,160 B2 * | 8/2011 | Lindner et al. | 280/47.34 |
| 2001/0045718 A1 * | 11/2001 | Boirum | 280/47.26 |
| 2002/0096844 A1 * | 7/2002 | Clegg | 280/47.17 |
| 2002/0114689 A1 * | 8/2002 | McGill et al. | 414/634 |
| 2002/0185831 A1 * | 12/2002 | Chan | 280/47.26 |
| 2003/0001348 A1 * | 1/2003 | Weida | 280/47.19 |
| 2003/0038458 A1 * | 2/2003 | Noffsinger | 280/651 |
| 2003/0098559 A1 * | 5/2003 | Reese | 280/32.6 |
| 2003/0227147 A1 * | 12/2003 | Alveteg et al. | 280/47.2 |
| 2004/0140649 A1 * | 7/2004 | Faden | 280/651 |
| 2006/0006621 A1 * | 1/2006 | Santa Cruz et al. | 280/79.3 |
| 2006/0182578 A1 * | 8/2006 | Morton | 414/537 |
| 2006/0208240 A1 * | 9/2006 | Spittle et al. | 254/8 B |
| 2007/0045973 A1 * | 3/2007 | Grosso | 280/47.26 |
| 2007/0187916 A1 * | 8/2007 | Gregory et al. | 280/79.3 |
| 2007/0292252 A1 * | 12/2007 | McGill et al. | 414/634 |
| 2008/0007019 A1 * | 1/2008 | Sparkowski | 280/79.3 |
| 2008/0053946 A1 * | 3/2008 | Choate et al. | 212/306 |
| 2008/0191437 A1 * | 8/2008 | Staub | 280/47.34 |
| 2009/0026732 A1 * | 1/2009 | Lindner et al. | 280/638 |
| 2009/0309322 A1 * | 12/2009 | Selvig et al. | 280/33.996 |
| 2011/0049824 A1 * | 3/2011 | Bar-Erez et al. | 280/47.18 |
| 2011/0115178 A1 * | 5/2011 | De Sousa | 280/47.35 |

* cited by examiner

PORTABLE CART FOR HOLDING MULTIPLE TRAYS OF GLASSES

BACKGROUND

The present disclosure generally relates to a mobile apparatus for assisting with the transportation, delivery and removal of glassware from a first location to at least one subsequent location and in particular to a rolling cart for use in a commercial environment.

In the restaurant industry, for example, oftentimes employees are required to set up and/or break down numerous table settings. Placing or removing a plurality of glasses on or from a plurality of tables can be a time-consuming and labor-intensive task. The multiple trips often required to deliver or remove a large quantity of glasses can be tiring and result in a waste of valuable time. Employees may accumulate many glasses on a single tray or shelf. This may not only strain the employees' arms and back, but may produce a situation where glasses are likely to fall easily from the tray and break. Routinely, purchasing replacement glasses may be costly to the establishment owner. Therefore, it is desirable to have a simple way to transport many glass racks into an area allowing glasses to be quickly and easily placed on a table or removed may assist employees while doing so in a timely fashion with reduced effort or physical strain.

SUMMARY

Briefly described, in one embodiment, a mobile cart is disclosed for transporting, collecting, or storing tableware or glassware. The mobile cart may comprise a frame, a base and pivotally connected shelves. The frame may comprise at least two vertical frame members and at least one horizontal frame member. The horizontal frame member extends between adjacent vertical frame members. The base may be connected to an end of the frame and comprise at least two lateral frame members with each lateral frame member extending between each of the at least two vertical frame members and at least one horizontal frame member extending between the at least two lateral frame members. At least one shelf is pivotally connected to the at least two vertical members and at least three wheel assemblies are attached to the base to support the cart in a stable manner.

The foregoing descriptions of specific embodiments of the present invention have been presented for purposes of illustration and description. They are not intended to be exhaustive or to limit the present invention to the precise forms disclosed, and obviously many modifications and variations are possible in light of the disclosure. The exemplary embodiment was chosen and described in order to explain the principles of the present invention and its practical application, thereby to enable others skilled in the art to utilize the present invention and various embodiments with various modifications as are suited to the particular use contemplated.

BRIEF DESCRIPTION OF THE FIGURES

The drawing figures emphasize the general principles of the present disclosure and are not necessarily drawn to scale. Reference characters designating corresponding components are repeated as necessary throughout the figures for the sake of consistency and clarity.

DETAILED DESCRIPTION

The present disclosure is directed to a rack or cart having at least one shelf or tray to transport, distribute, collect or store glassware and/or tableware. Although disclosed primarily within the context of a cart for distributing and collecting drinking glasses in a food service environment or a commercial environment, the skilled artisan will recognize that the principles of the present disclosure are not so limited but extend to the transportation, distribution, collection or storage of numerous articles used in the food service industry such as plates, bowls, utensils and cookware.

For clarity of discussion, the following three directional definitions and coordinate system are commonly used when discussing structures in 3 dimensional space. A Cartesian coordinate system 1 is shown on FIG. 1 and has a vertical axis 2, a horizontal axis 3 and a lateral axis 4. Collectively, the three orthogonal directional axes 2, 3, 4 establish the Cartesian coordinate system 1.

Figure 1:
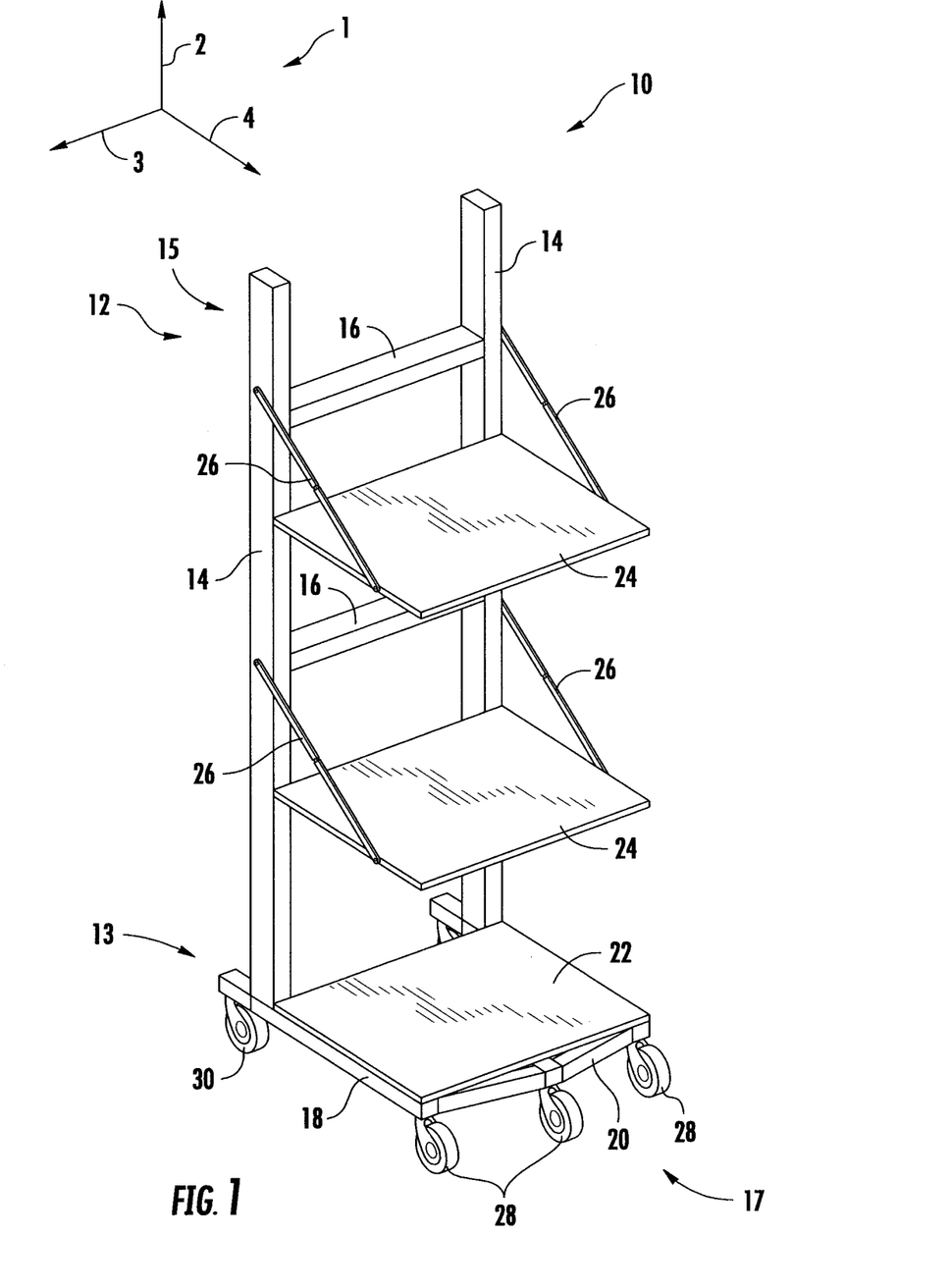
FIG. 1 is an isometric view of a mobile cart according to a an embodiment of the disclosure.

FIG. 1 is an isometric view of an embodiment of a mobile cart 10 as disclosed herein. The cart 10 is comprised of a frame 12, a base 13 and at least one support shelf 24. The frame 12 and the base 13 in part establish the size and cart footprint of the mobile cart 10. The term cart footprint as used herein is understood to mean an area on a surface that the mobile cart 10 will cover or occupy on the floor or surface on which the cart 10 is supported.

The frame 12 may comprise a plurality of vertical frame members 14 and at least one horizontal frame member 16. The vertical frame members 14 are spaced apart from each other in the horizontal direction 3 and at least one horizontal frame member 16 extends between adjacent vertical frame members 14. The vertical members 14 may be spaced a distance in the horizontal direction 3 that is sufficient to support adequately a storage rack, such as for example, a glass rack 40 (se FIG. 3b). The vertical frame members 14 may be arranged toward a rear 15 of the cart 10 and form a rear boundary or rear plane of the cart 10. The vertical frame members 14 generally extend in the vertical direction 2 and have a length that may vary depending on factors such as a desired mobile cart height or a desired number of shelves. The horizontal frame members 16 generally extend in the horizontal direction 3 and at least function to provide support and strength to the frame 12. The number of horizontal frame members 14 required may depend on the size of the frame 12 and the weight and size of the load to be transported by the mobile cart 10. In one embodiment, the mobile cart 10 may measure approximately 6 feet vertically (i.e. the approximate length of the vertical members 14), have a base 13 measuring about 39 inches on each side and have horizontal members to give the mobile cart 10 a width (i.e. the distance along the horizontal axis) of about 39 inches. It may have two glass rack holders plus an additional tray that lies flatly on the bottom.

The base 13 of the mobile cart 10 may be arranged toward a lower portion (as measured in the vertical direction 2) of the frame 12 and attached to a lower end of the frame 12. The base 13 may be comprised of at least two spaced apart lateral frame members 18 with each lateral frame member 18 attached to a lower end of a vertical frame member 14. The lateral frame members 18 generally extend in the lateral direction 4. A horizontal base member 20 may also be used to form a portion of the base 13. As illustrated, the horizontal base member 20 extends in the horizontal direction 3 and between adjacent lateral frame members 18 and at least functions to support and strengthen the frame. The base 13 may further comprise a plurality of wheel assemblies 28, 30. Each wheel assembly 28, 30 may comprise an attachment system that secures the wheel assembly 28, 30 to the base 13 and a wheel mounted in a journal. The wheel assemblies 28, 30 may facilitate moving the cart 10 from one location to another by allowing the cart 10 to roll. An appropriate number of wheel assemblies 28, 30 may be attached to the base 13 to provide stability and enhance mobility of the cart 10. As illustrated, the base 13 has five wheel assemblies 28, 30 with two wheel assemblies 30 arranged toward a rear 15 of the cart 10 and three wheel assemblies 28 arranged toward a front 17 of the cart 10. As such, the cart 10 is stable and balanced and able to move in a safe manner by a user pushing against the vertical members 14 of the cart 10 to propel the cart 10. At least a minimum of three wheel assemblies 28, 30 arranged in a substantially triangular configuration are necessary for the cart 10 to be stable.

As seen in FIGS. 2a-2d, the base 13 may comprise adjustable lateral frame members 32 that adjustably extend in the lateral direction 4 from a first position (i.e. substantially aligned with a rear plane established by the vertical frame members 14) to a second position (i.e. beyond the rear plane established the vertical frame members 14) to increase effectively the size of the cart footprint. The adjustable lateral frame members 32 may be in sliding relation with the lateral frame members 18, with the two frame members 18, 32 moving relative to each other. The adjustable lateral frame member 32 may be configured to be received by the lateral frame member 18 in a telescopic fashion, with an adjustable lateral frame member 32 being housed within a lateral frame member 18. As illustrated, rear wheel assemblies 30 are attached to adjustable lateral frame members 32 and can extend away from the rear plane. With the rear wheel assemblies 30 extending away from the rear plane, the cart 10 may be more stable and be able to safely transport a heavier and/or larger load. It is anticipated that locking features (not shown) may be provided to secure the adjustable lateral frame member 32 relative to the lateral frame member 18 and prevent relative motion of the two members 18, 32 during use of the cart 10.

Figure 2A:
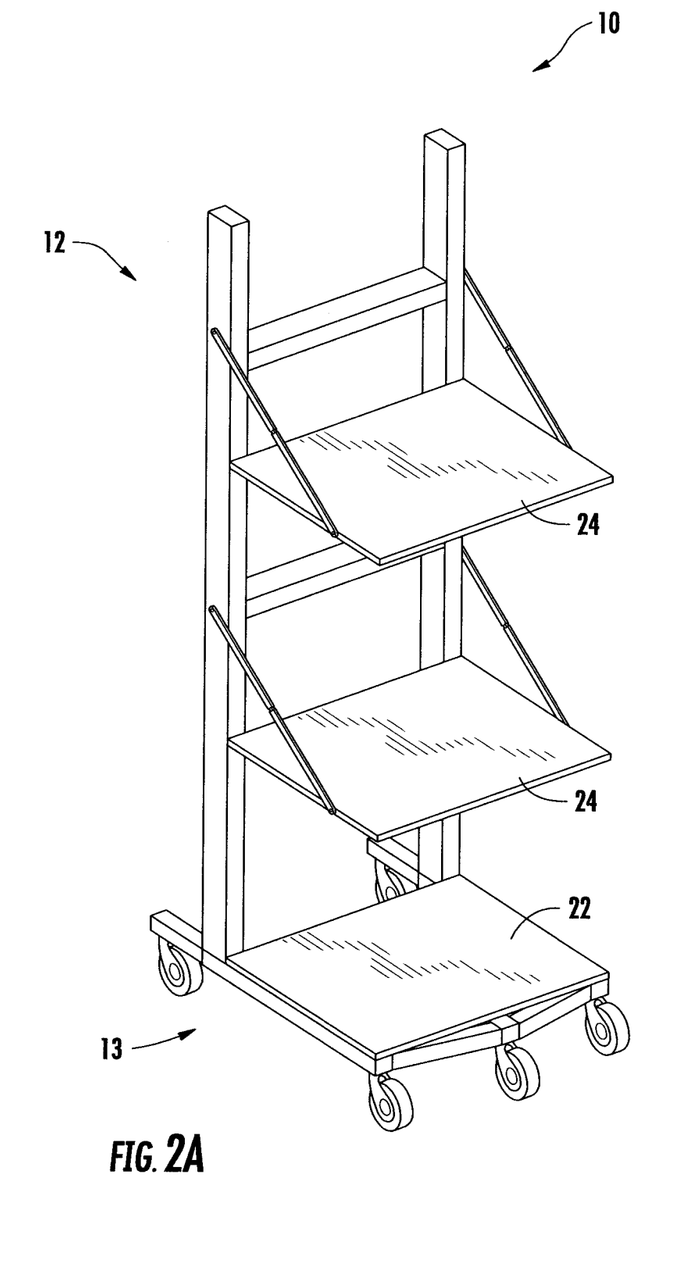
FIGS. 2a-2d are isometric views of the mobile cart according to an embodiment of the disclosure.
Figure 2B:
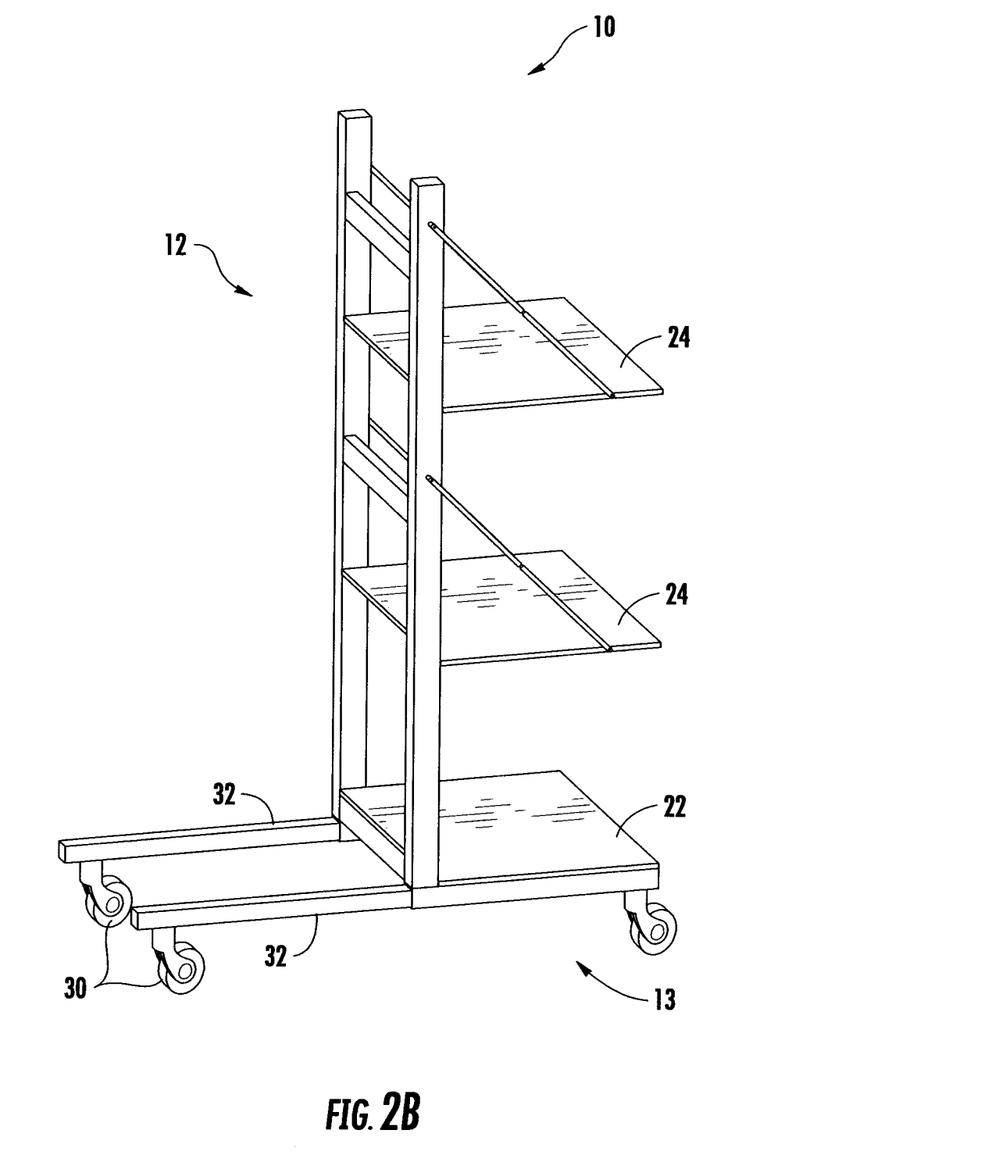

In some embodiments, a storage container 34 (See FIG. 2d) may be attached or connected to the base 13 of the cart 10. The storage container 34 may include a frame portion 36 that supports the storage container 34 and be physically connected to the base 13 and a wheel assembly 28, similar to other wheel assemblies discussed herein, attached to an underside of the frame portion 36. The wheel assembly 28 supports the frame portion 36 and storage container 34 above the ground or floor and allows the storage container 34 to move with the cart 10 when the cart is moving. Also, the assembly provides stability to the frame portion 36 while attached to the base 13. The storage container 34 may be a bucket 34 and more particularly, a 5 gallon bucket 34. The storage container 34 may be used to receive and store liquids from collected glassware while the cart 10 is in use, allowing the process of collecting glassware to be more efficient. The frame portion 36 may not be necessary. A wheel assembly 38 may be attached directly to the storage container 34 and the storage container 34 attached directly to the base 13. The frame portion 36 may be an adjustable frame portion that is connected to the base 13 to create a sliding joint such that the frame portion 36 may be extended from the base 13 and able to receive the storage container 34 when in an extended configuration. The frame portion 36 may adjust between a first position (i.e. within or under the base 13) and a second position (i.e. extended and able to receive and support the storage container 34). As seen in FIGS. 1 and 2b, one of the wheel assemblies 28 (i.e. the wheel assembly 28 arranged between the two outer wheel assemblies 28) may be connected to the frame portion 36 and move with the frame portion 36 when the frame portion 36 is extended from the base 13. With the frame portion 36 attached to the base 13, the cart 10 may be even more stable and sturdy.

Figure 2C:
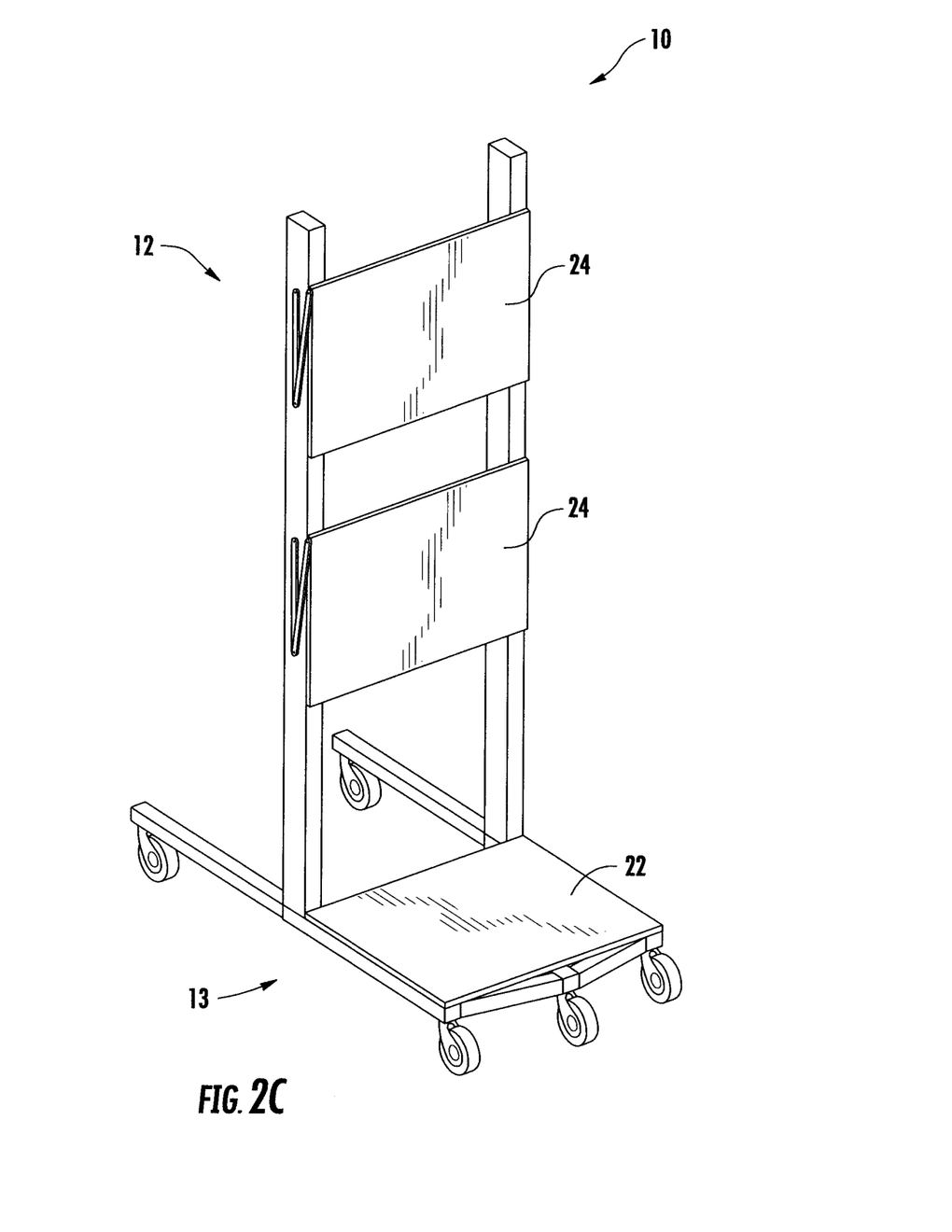
Figure 2D:
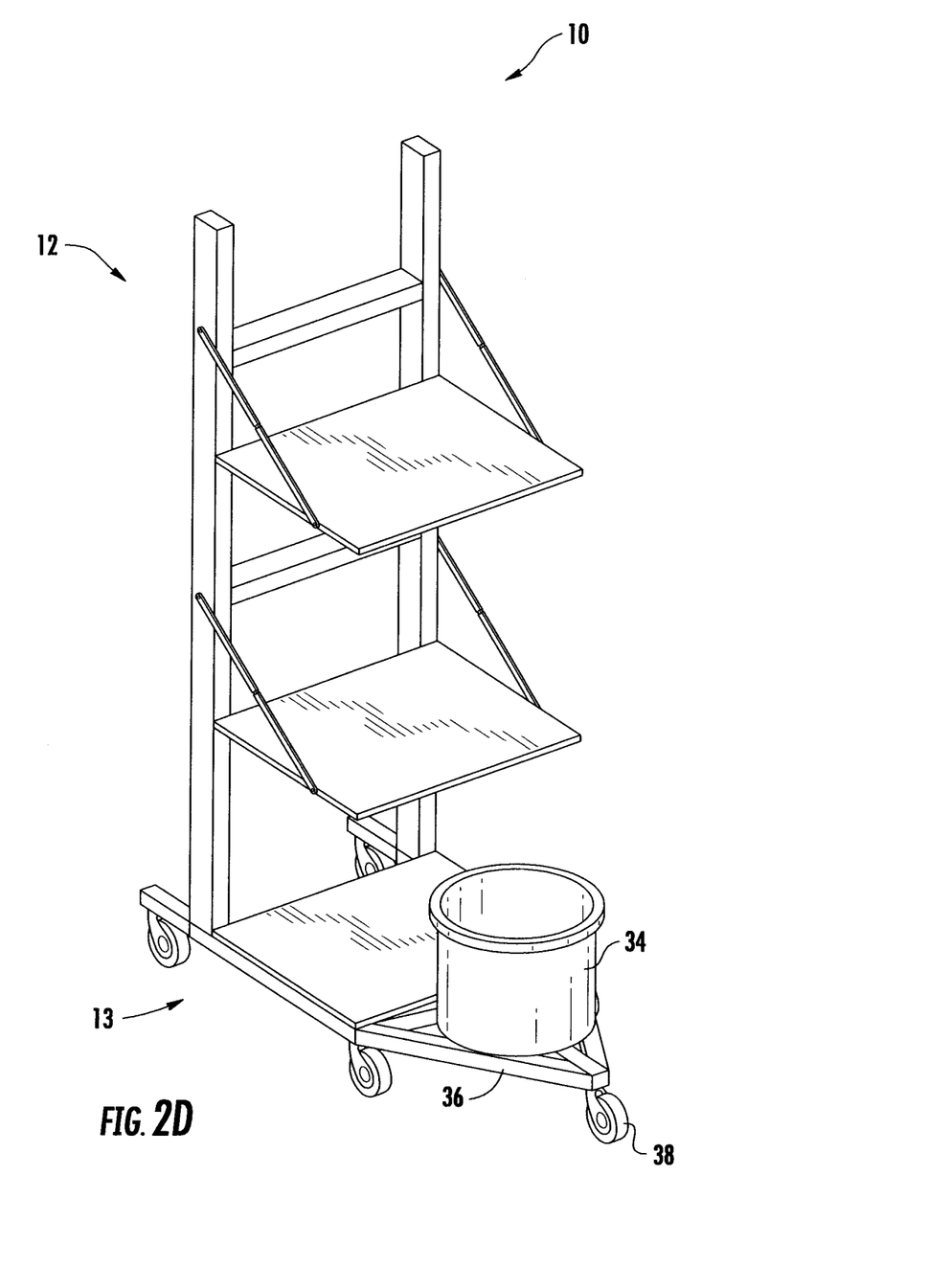

The cart 10 may comprise at least one shelf 24 and the at least one shelf 24 may be attached to vertical frame members 14 so as to pivot between an open position (See FIG. 2b) and a closed position (See FIG. 2c). A hinge arrangement is but one of many acceptable arrangements that may allow the shelf 24 to pivot from the open to closed position. In the open position, the shelf 24 is substantially horizontal and in position to accept, store, deliver, or transport, for example, tableware. As illustrated, the mobile cart 10 has two shelves 24 and a base shelf 22. The number of shelves 24 the cart 10 can accommodate will depend somewhat on the height of the cart 10. However, in the preferred embodiment, the cart 10 has two shelves 24 and a base shelf 22. A strut 26 may be arranged on either side, or both sides, of the shelf 24 and extend from the shelf 24 to the vertical member 14. The strut 26 is adjustable so as to move from a locked position when the shelf 24 is in the open position and a storage position when the shelf 24 is in the closed position. In the locked position, the strut 26 is a load bearing member and reduces the load applied to a pivot axis (i.e. the axis the shelf pivots about when moving from the open position to the closed position) of the shelf 24. The strut 26 may also increase the weight the shelf 24 can support while at the same time increasing the mechanical integrity of the shelf 24 and mobile cart 10. The base shelf 22 may form a portion of the base 13 and may or may not be pivotally attached to the base 13. With the base shelf 22 secured to the base 13, the mobile cart 10 may be able to resist torsion or twisting of the frame 12.

Figure 3A:
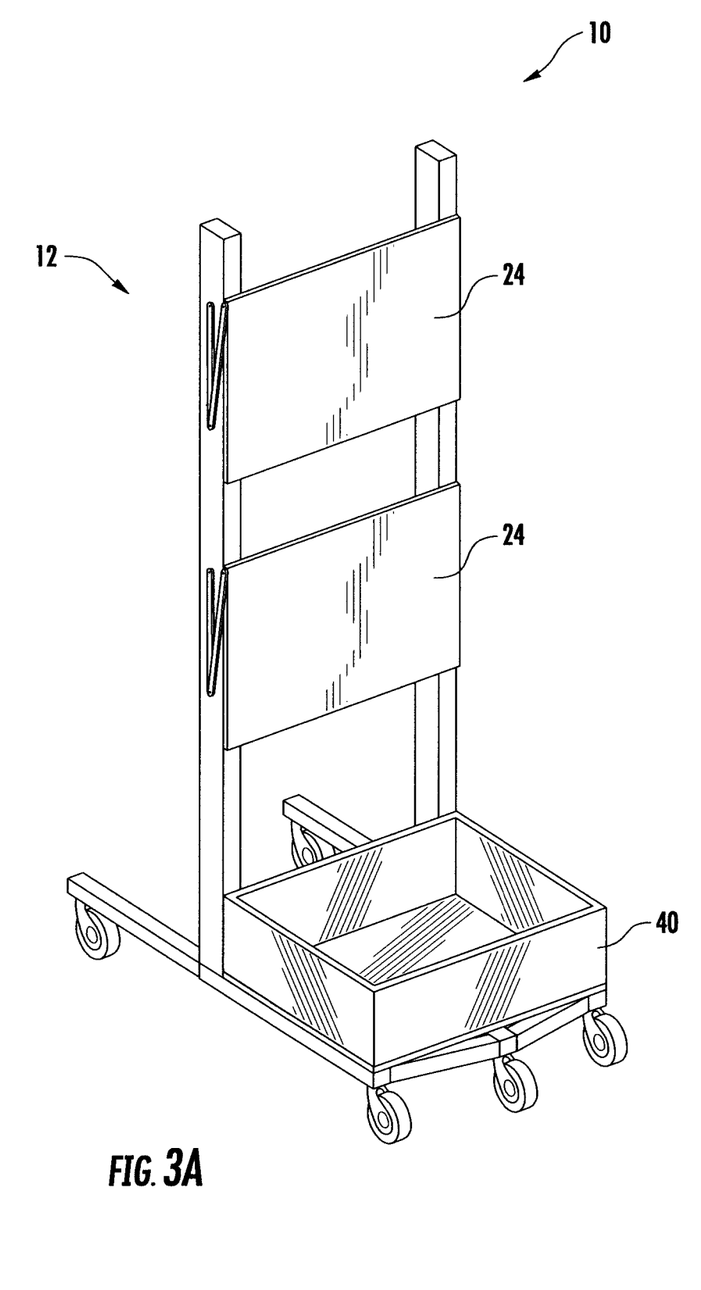
FIGS. 3a-3c are isometric views of the mobile cart according to an embodiment of the disclosure and shown configured to transport glassware.
Figure 3B:
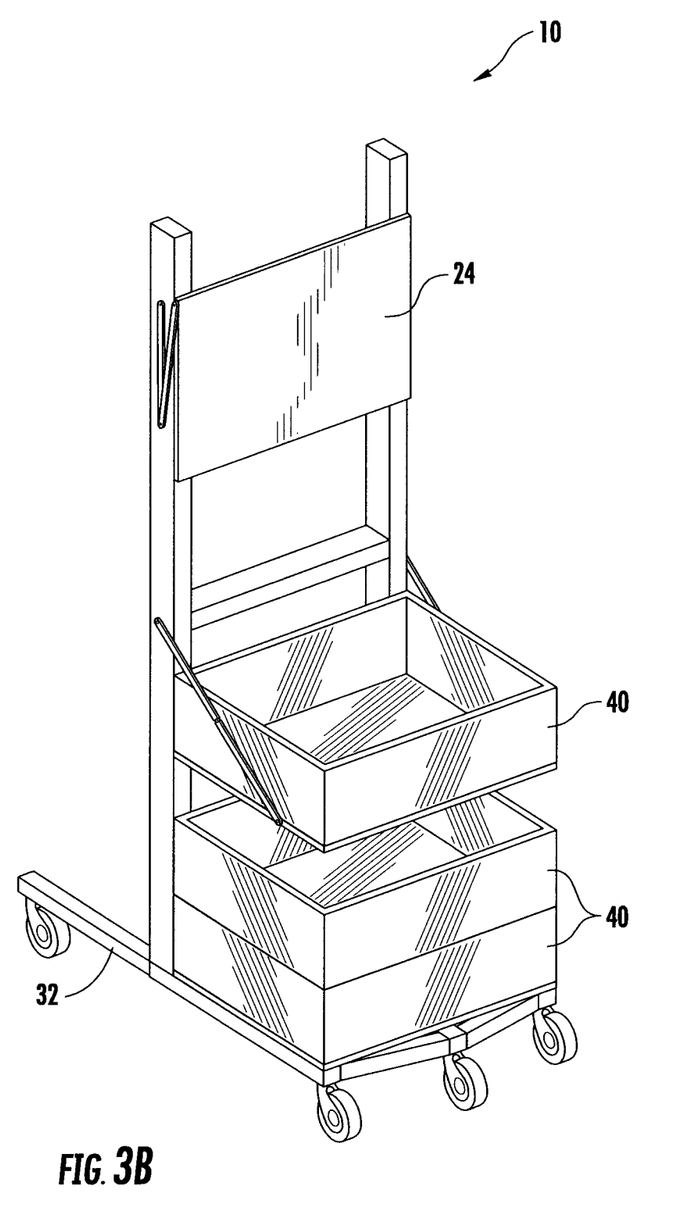
Figure 3C:
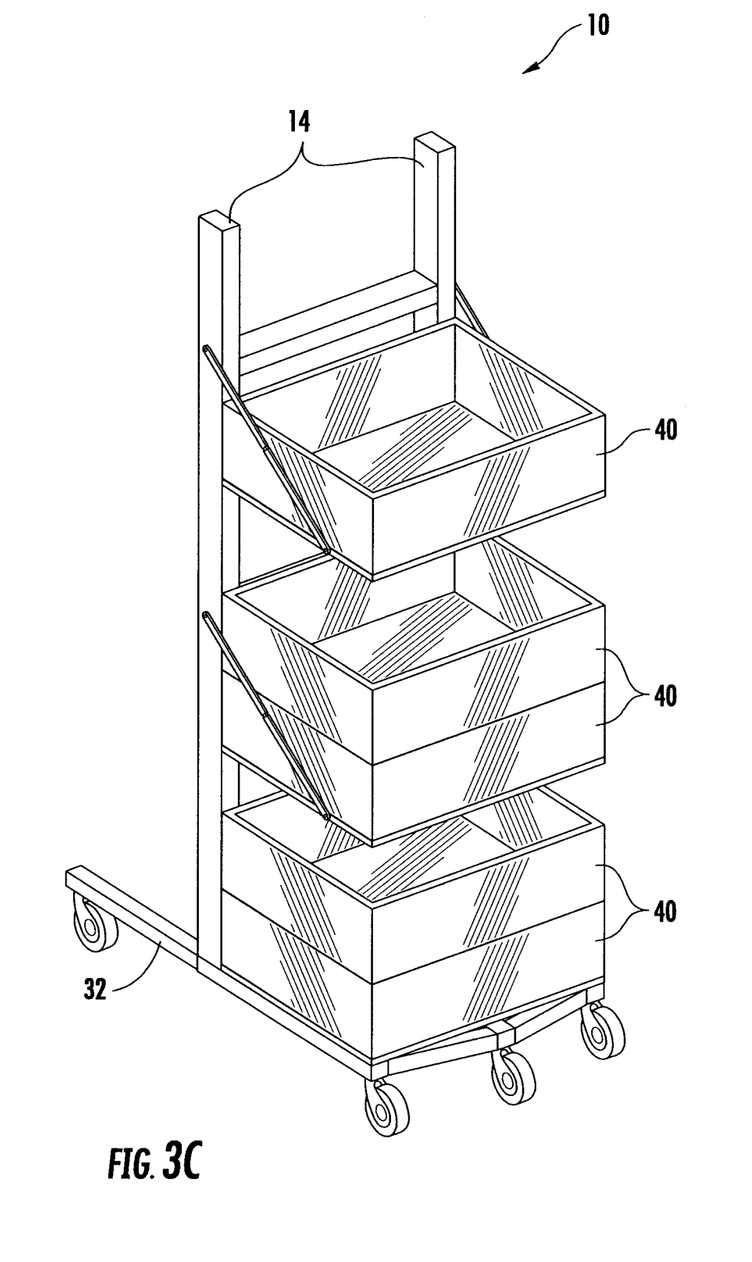

FIGS. 3a-3c are isometric views of the cart 10 in use. FIG. 3a illustrates the mobile cart 10 with a single glass rack 40 supported by the base shelf 22. Although illustrated as supporting a glass rack 40, the shelves 22, 24 of the mobile cart 10 may be sized to support any type of rack, tub or container used in a commercial environment. In this embodiment, the shelves 22, 24 are spaced such that two glass racks 40 may be supported on each shelf 22, 24. FIG. 3b shows the mobile cart 10 with a shelf 24 in the open position supporting a glass rack 40, the base shelf supporting two glass racks 40 and a shelf 24 in the closed position. Also, the adjustable lateral frame members 32 are extended away from the rear plane in order to increase the stability of the cart 10. FIG. 3c shows the mobile cart 10 with both shelves 24 in the open position, one shelf 24 supporting two glass racks 40, one shelf 24 supporting one glass rack 40 and the base shelf 22 supporting two glass racks 40.

The mobile cart 10 offers a user an efficient way to place glasses quickly at a table setting in a commercial environment. This is accomplished by having the ability to store and transport a large volume of tableware on the mobile cart 10. As disclosed, there may also be extended wheel assemblies 28 and a frame portion 36 that can be pushed back into the mobile cart 10 when not in use. On the base 13, there may be two adjustable lateral frame members 32 that extend in the lateral direction 4. This may make the cart 10 safer and improve stability and balance during motion. Users may also utilize the top of this area (i.e. the space between adjustable lateral frame members 32) to stack empty glass racks 40. A hose (not shown) may be built directly into the shelves 24 and deliver excess fluids and moisture to the storage container 34.

The mobile rack 10 can easily hold multiple glass racks 40 so they may be transported into a recreation space with glasses being removed from the glass racks 40 and placed on a table, for example. This cart 10 can assist the user in quickly and efficiently setting glasses, either full or empty, on a table without strain or having to make multiple trips. The cart 10 may be ideal for use in hotels, banquet facilities, private clubs, restaurants and catering companies for an easy way to transport stacks of glass racks 40 into and out of any facility.

The cart 10 may be produced from aluminum, plastic or any other similar material with rubber wheels. The exact dimensions and materials used for construction and method of operation of mobile cart 10 may vary upon manufacturing method, material cost, function and use of the cart 10 and environment to name but a few.

It will be apparent to those skilled in the art that various modifications and variations can be made without departing from the spirit and scope of the invention exemplified herein, which is limited only by the claims.

What is claimed is:

1. A cart comprising:
    a frame comprising at least two vertical frame members and at least one horizontal frame member extending between the at least two vertical frame members;
    a base connected to an end of the frame, the base comprising at least two longitudinal frame members respectively coupled to said at least two vertical frame members, said longitudinal frame members extending in a direction perpendicular to each of the at least two vertical frame members, at least one lateral frame member extending between the at least two longitudinal frame members, and at least two adjustable frame members that extend in a direction substantially perpendicular to the vertical frame members, wherein the at least two adjustable frame members are mounted in sliding relation to the at least two longitudinal frame members, respectively;
    at least one shelf pivotally connected to the at least two vertical members;
    at least three wheel assemblies attached to the base to support the cart in a stable manner; and
    a frame portion configured to receive a storage container, the frame portion connected to the base and extending from the base;
    wherein the frame portion for the storage container comprises an additional wheel assembly;
    wherein the frame portion is an adjustable frame portion and moves between a first position and a second position;
    wherein the frame portion and the at least two adjustable frame members are adjustable in opposite respective directions away from the base.

2. The cart of claim 1, wherein two of the at least three wheel assemblies are connected to the adjustable frame members.

3. The cart of claim 1, wherein the adjustable frame members extend from a first position to a second position.

4. The cart of claim 1, wherein the at least one shelf pivots from a horizontal position to a vertical position.

5. The cart of claim 4, wherein the at least one shelf further comprises a strut member extending from the vertical frame member to a side of the shelf.

6. The cart of claim 5, wherein the strut member pivots when the shelf pivots from the horizontal position to the vertical position.

7. The cart of claim 1, further comprising at least two shelves pivotally connected at different vertical locations to the at least two vertical members.

8. The cart of claim 1, wherein the storage container is a bucket.

9. The cart of claim 1, wherein the at least two adjustable frame members extend beyond a rear plane established by the at least two vertical frame members, and the at least two longitudinal frame members extend to a front end of the cart.

* * * * *